US012581140B2

(12) United States Patent
Giladi et al.

(10) Patent No.: US 12,581,140 B2
(45) Date of Patent: Mar. 17, 2026

(54) METHODS AND SYSTEMS FOR CONTENT STORAGE

(71) Applicant: Comcast Cable Communications, LLC, Philadelphia, PA (US)

(72) Inventors: Alexander Giladi, Centennial, CO (US); Robert Dandrea, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/512,971

(22) Filed: Nov. 17, 2023

(65) Prior Publication Data

US 2025/0168419 A1 May 22, 2025

(51) Int. Cl.
*H04N 21/231* (2011.01)
*H04N 21/234* (2011.01)
*H04N 21/2662* (2011.01)

(52) U.S. Cl.
CPC ..... *H04N 21/23113* (2013.01); *H04N 21/234* (2013.01); *H04N 21/2662* (2013.01)

(58) Field of Classification Search
None
See application file for complete search history.

(56) References Cited

U.S. PATENT DOCUMENTS

| | | | |
|---|---|---|---|
| 9,277,234 B1 * | 3/2016 | Whillock | ................ H03M 7/30 |
| 2014/0023340 A1 * | 1/2014 | Civiletto | .......... H04N 21/47202 |
| | | | 386/E5.009 |
| 2015/0350365 A1 * | 12/2015 | Khakpour | ............. G06F 12/123 |
| | | | 709/213 |
| 2023/0280923 A1 * | 9/2023 | Velasco | ................. G06F 3/0607 |
| 2024/0185891 A1 * | 6/2024 | Rabinowitz | ...... H04N 21/23106 |

* cited by examiner

*Primary Examiner* — Junior O Mendoza
(74) *Attorney, Agent, or Firm* — Ballard Spahr LLP

(57) ABSTRACT

Methods, apparatuses, and systems are described for reducing the amount of storage space required to store content item recordings. A content item may include one or more portions. A playback probability may be determined based on a duration of time a content item is stored in a storage location. One or more of the portions of the content item may be removed based on the playback probability associated with the content item.

22 Claims, 9 Drawing Sheets

600

┌─── 602
DETERMINE A PLURALITY OF UNIQUE PORTIONS OF A CONTENT ITEM AND A PLURALITY OF COMMON PORTIONS OF THE CONTENT ITEM

┌─── 604
DETERMINE A PLAYBACK PROBABILITY ASSOCIATED WITH EACH RECORDING OF THE PLURALITY OF RECORDINGS

┌─── 606
CAUSE AT LEAST ONE UNIQUE PORTION OF THE PLURALITY OF UNIQUE PORTIONS TO BE REMOVED FROM STORAGE

Figure 6:
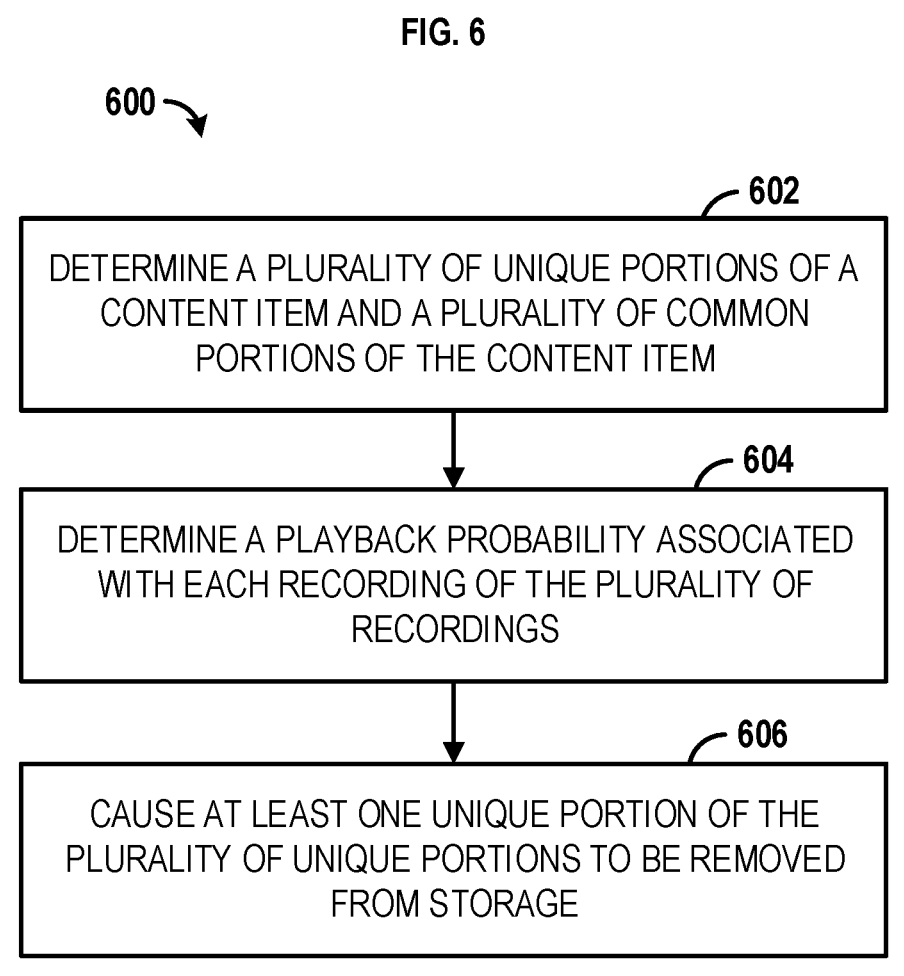

DETERMINE A PLURALITY OF UNIQUE PORTIONS OF A CONTENT ITEM AND A PLURALITY OF COMMON PORTIONS OF THE CONTENT ITEM

604

DETERMINE A PLAYBACK PROBABILITY ASSOCIATED WITH EACH RECORDING OF THE PLURALITY OF RECORDINGS

606

CAUSE AT LEAST ONE UNIQUE PORTION OF THE PLURALITY OF UNIQUE PORTIONS TO BE REMOVED FROM STORAGE

Figure 7:
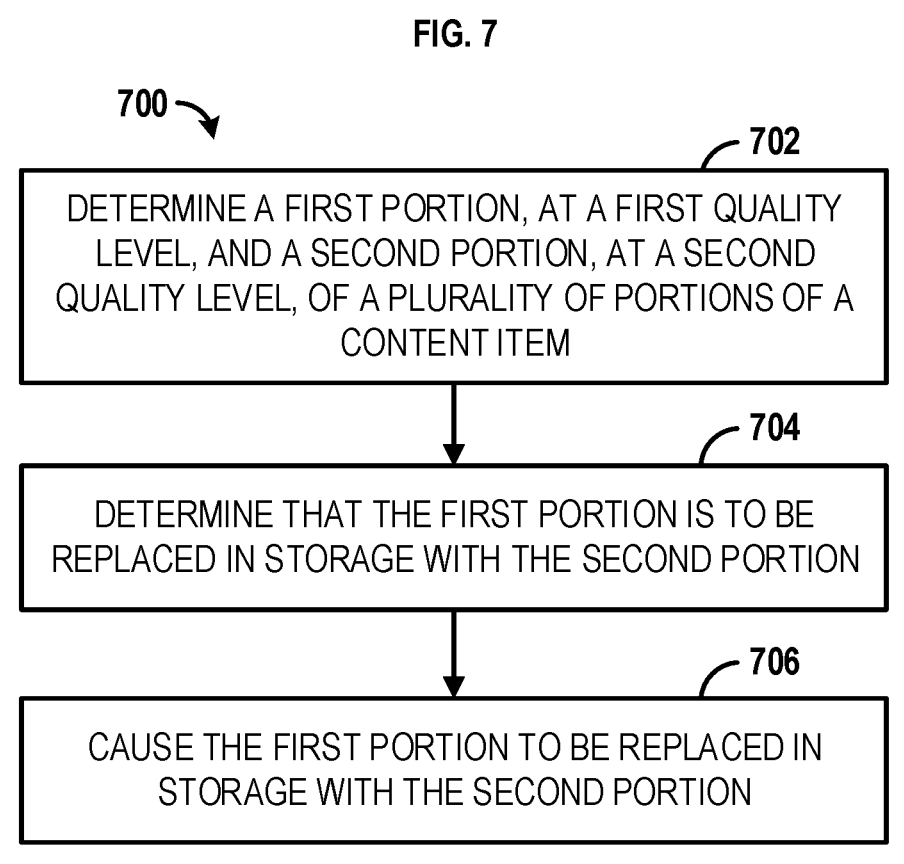

DETERMINE A FIRST PORTION, AT A FIRST QUALITY
LEVEL, AND A SECOND PORTION, AT A SECOND
QUALITY LEVEL, OF A PLURALITY OF PORTIONS OF A
CONTENT ITEM

704

DETERMINE THAT THE FIRST PORTION IS TO BE
REPLACED IN STORAGE WITH THE SECOND PORTION

706

CAUSE THE FIRST PORTION TO BE REPLACED IN
STORAGE WITH THE SECOND PORTION

METHODS AND SYSTEMS FOR CONTENT STORAGE

BACKGROUND

Digital video record (DVR) services allow users to record and watch their favorite content at their convenience, without being restricted by a broadcast schedule. Conventional cloud DVR (cDVR) systems allow users to record and store content in a remote storage location, such as a remote data center, instead of on a physical device in their home. This allows users to access content from any device that is capable of connecting to the Internet. In addition, this eliminates the need for additional storage space on users' devices, allowing recordings of content easily portable to other devices. However, conventional cDVR systems require a large amount of storage, especially as users keep stored content for long periods of time without ever playing back the content and where some situations require unique copies of content to be stored for every user that records the content.

SUMMARY

It is to be understood that both the following general description and the following detailed description are exemplary and explanatory only and are not restrictive. Methods, systems, and apparatuses systems for improved content storage are described.

A device (e.g., a server device, a cloud computing device, etc.) may receive and store content. The device may determine a plurality of first portions and a plurality of second portions of a content item that are associated with a plurality of recordings of the content item in storage. A playback probability associated with each recording may be determined based on a duration of time since each recording was initially stored. Based on the playback probability, one or more portions of the content item may be removed from storage.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIG. 6 shows a flowchart of an example method;
FIG. 7 shows a flowchart of an example method.

DETAILED DESCRIPTION

Figure 1:
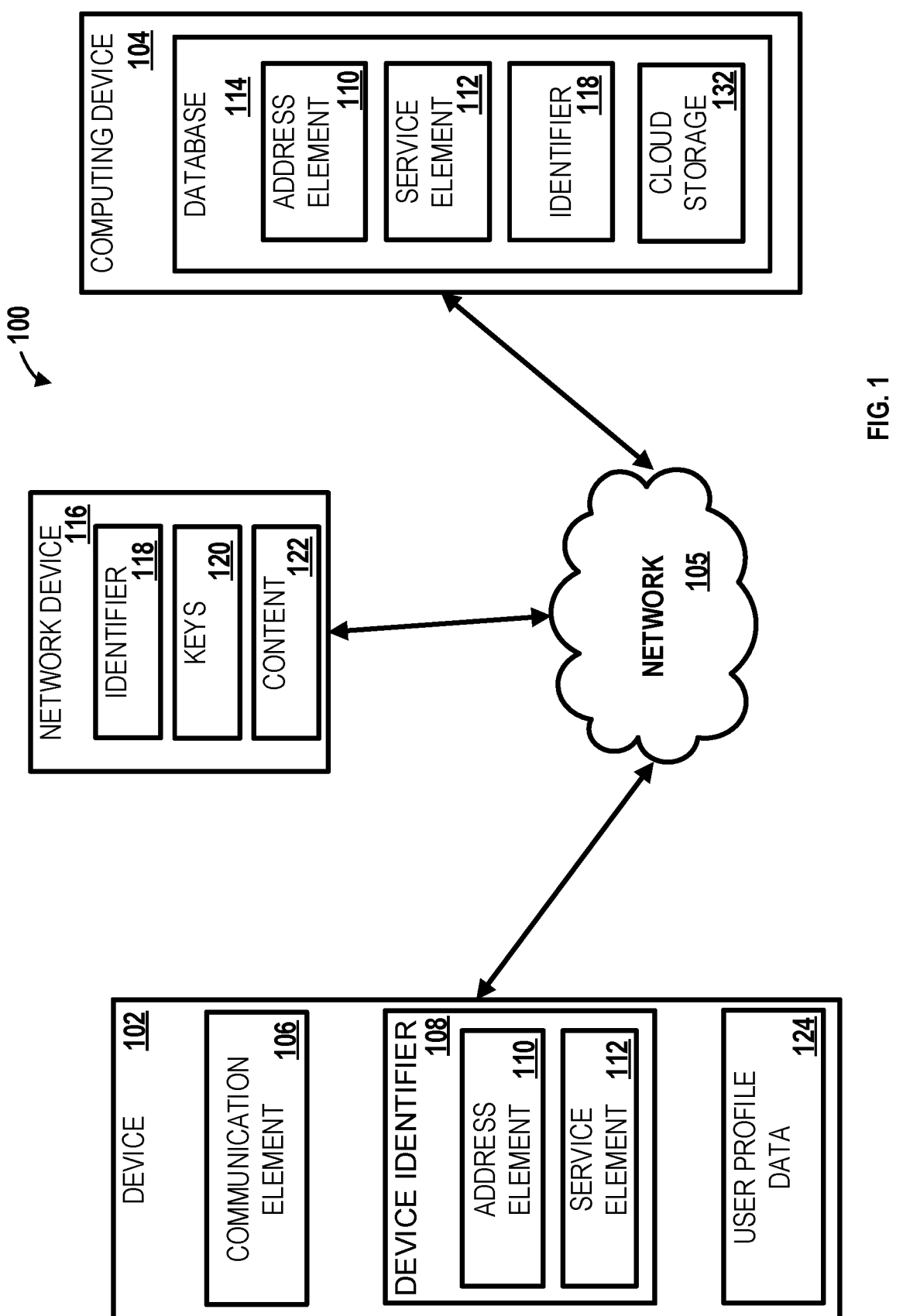
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

FIG. 1 shows an example system 100 for providing efficient storage of a plurality of portions of a content item. For example, a plurality of first portions and a plurality of second portions of the content item may be determined. The plurality of first portions and the plurality second portions may be associated with a plurality of recordings of the content item in storage. One or more portions of the content item may be removed from storage based on a playback probability associated with at least one recording of the plurality of recordings. In an example, a first portion and a second portion of a plurality of portions of the content item may be determined. The first portion may be replaced with the second portion based on a difference in quality between the first portion and the second portion. In an example, a first reference frame and a second reference frame of a plurality of reference frames of a content item may be determined. The first reference frame may be replaced with the second reference frame based on an encoding parameter associated with the content item. The system may comprise a device 102 in communication with a network device 116 and/or a computing device 104 via a network 105. The computing device 104 may be disposed locally or remotely relative to the device 102. As an example, the device 102 and the computing device 104 may be in communication via a private and/or public network 105 such as the Internet or a local area network (LAN). Other forms of communications can be used such as wired and wireless telecommunication channels, for example.

The device 102 may comprise a user device. The user device may comprise an electronic device such as a smart television, a computer, a smartphone, a laptop, a tablet, a set top box, a display device, a monitor, a wearable computing device, a mobile computing device, or other device capable of communicating with the computing device 104. The device 102 may comprise a communication element 106 and a device identifier 108.

The communication element 106 may provide an interface to a user to interact with the device 102 and/or the computing device 104. The communication element 106 can be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces can be used to provide communication between the user and one or more of the device 102, the network device 116, and the computing device 104. As an example, the communication element 106 can request or query various files from a local source and/or a remote source. As an example, the communication element 106 can transmit data to a local or remote device such as the network device 116 and/or the computing device 104.

The device 102 may be associated with a user identifier or a device identifier 108. As an example, the device identifier 108 may be any identifier, token, character, string, or the like, for differentiating one user or user device (e.g., device 102) from another user or user device. In an example, the device identifier 108 may identify a user or user device as belonging to a particular class of users or user devices. As an example, the device identifier 108 may comprise information relating to the device 102 such as a manufacturer, a model or type of device, a service provider associated with the device 102, a state of the device 102, a locator, and/or a label or classifier. Other information can be represented by the device identifier 108.

The device identifier 108 may comprise an address element 110 and a service element 112. In an example, the address element 110 can comprise or provide an internet protocol address, a network address, a media access control (MAC) address, international mobile equipment identity (IMEI) number, international portable equipment identity (IPEI) number, an Internet address, or the like. As an example, the address element 110 can be relied upon to establish a communication session between the device 102 and the computing device 104 or other devices and/or networks. As an example, the address element 110 can be used as an identifier or locator of the device 102. In an example, the address element 110 can be persistent for a particular network.

The service element 112 may comprise an identification of a service provider associated with the device 102, with the class of device 102, and/or with a particular network 105 with which the device 102 is currently accessing services associated with the service provider. The class of the device 102 may be related to a type of device, capability of device, type of service being provided, and/or a level of service (e.g., business class, service tier, service package, etc.). As an example, the service element 112 may comprise information relating to or provided by a communication service provider (e.g., Internet service provider) that is providing or enabling data flow such as communication services to the device 102. As an example, the service element 112 may comprise information relating to a preferred service provider for one or more particular services relating to the device 102. In an example, the address element 110 can be used to identify or retrieve data from the service element 112, or vice versa. As an example, one or more of the address element 110 and the service element 112 may be stored remotely from the device 102 and retrieved by one or more devices such as the device 102 and the computing device 104. Other information may be represented by the service element 112.

The device 102 may include, generate, and/or store user profile data 124 associated with one or more users of the device 102. For example, a user may send a request to the computing device 104 to record content. The content may be subsequently stored by, or at, the computing device 104. The user profile data 124 may be used to associate the requested content with a user of the user profile data 124. The requested content may be stored in a storage location according to the user profile data 124.

The computing device 104 may comprise a server and/or a cloud computing device for communicating with the device 102 and/or the network device 116. For example, the computing device 104 may comprise one or more of an edge cache device, a mid-tier cache device, a cloud storage device, and/or a server. As an example, the computing device 104 may communicate with the device 102 for providing data and/or services. As an example, the computing device 104 may provide services, such as network (e.g., Internet) connectivity, network printing, media management (e.g., media server), content services, streaming services, broadband services, or other network-related services. As an example, the computing device 104 may allow the device 102 to interact with remote resources, such as data, devices, and files. As an example, the computing device 104 may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may be configured to manage the communication between the device 102 and a database 114 for sending and receiving data therebetween. As an example, the database 114 may store a plurality of files (e.g., web pages), user identifiers or records, or other information. As an example, the device 102 may request and/or retrieve a file from the database 114. In an example, the database 114 may store information relating to the device 102 such as the address element 110, the service element 112, and/or viewership statistics 132. As an example, the computing device 104 may obtain the device identifier 108 from the device 102 and retrieve information from the database 114 such as the address element 110, the service element 112, and/or viewership statistics 132. As an example, the computing device 104 may obtain the address element 110 from the device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 or some other device or system.

The database 114 may comprise cloud storage 132. The computing device 104 may store content in the cloud storage 132 based on a user request to record the content. The computing device 104 may receive uncompressed video data, or an uncompressed content item, based on the user request. The computing device 104 may be configured to compress the uncompressed video data to generate a multi-rate content item comprising compressed video data. The multi-rate content item may comprise one or more data layers. The multi-rate content item may be associated with a layered codec such as LV-EVC to store the highest bitrate representation and/or by using mixed-resolution non-layered streams. The one or more data layers may comprise a base layer upon which one or more enhancement layers may be stacked to further enhance the quality of the data of the content item. For example, the multi-rate content item may comprise one or more video representations (e.g., one or more data layers) per its regular adaptive bitrate streaming (ABR) ladder (e.g., 1080p60 or 1080 resolution at 60 fps, 720p60, 540p60, 360p60, etc.). The enhancement layers may be used to generate high-resolution video out of lower-resolution base layers. For example, the enhancement layer may be used to generate 1080p60 content based on 540p60 content and 720p60 content based on 360p60 content. The multi-rate content item may be stored in the cloud storage 132. Since the probability of content playback may decrease as the recording age of the content item increases, the computing device 104 may be configured to implement a compaction process wherein the highest rate full-resolution representations (e.g., 720p60 layer and 1080p60 layer) may be removed from the multi-rate content item, leaving only the enhancement layers. In an example, the removed enhancement layers may be generated just in time at replacement time instead of encoding time.

Each content item may be associated with a manifest file, or a Media Presentation Description (MPD) file. The manifest file may comprise information describing one or more aspects of the associated content item that may be used by a user device (e.g., device 102) to playback the content and/or for a content recording system (e.g., cloud DVR) to store and retrieve the content. The manifest file may indicate the availability of one or more segments (e.g., portions) comprising the content, a length of each segment, a number of segments, and/or an order of playback associated with the segments. The manifest may further comprise a network location (e.g., a hyper-text transfer protocol (HTTP) uniform resource locator (URL) link or other universal resource identifier (URI)) for each segment from which the segment may be downloaded, accessed, or retrieved. In an example, the network locations may indicate one or more source locations. For example, the network locations may reference a storage location of one or more segments, or portions, of the content item. In an example, the manifest file may describe one or more versions/representations (e.g., different quality levels, bitrates, resolutions, etc.) associated with the content item. For example, the manifest file may describe multiple bit rate and/or resolution versions/representations of the content item. The manifest file may be provided by the computing device 104 to the device 102 in response to a request by the device 102 for stored/recorded content. The device 102 may download/stream the requested content using the network locations specified in the manifest file. In an example, an initial manifest file may be received, or generated, when a content item is initially compressed and stored in the cloud storage 132. The initial manifest file may comprise the descriptions associated with the versions/representations of the content item. The initial manifest file may be updated (e.g., modified) to remove the descriptions associated with the versions/representations that were removed during the compaction process while the content item is stored in the cloud storage 132.

The computing device 104 may store content (e.g., content items) associated with a plurality of users in the cloud storage 132. The computing device 104 may determine a plurality of first portions (e.g., first representations) of a content item and a plurality of second portions (e.g., second representations) of the content item. For example, the computing device 104 may store each compressed multi-rate content item as a plurality of first portions and a plurality second portions. The plurality of first portions and the plurality of second portions may be associated with a plurality of recordings of a content item (e.g., compressed multi-rate content item) in storage. In an example, each recording may be segmented into a plurality of segments of the content item in the storage. Each first portion of the plurality of first portions and each second portion of the plurality of second portions may be associated with each segment of the plurality of segments. In an example, the plurality of first portions and the plurality of second portions may be associated with one or more of a plurality of bitrates, a plurality of representations, a plurality of resolutions, a plurality of enhancement layers, and/or a plurality of manifest files. The plurality first portions may be stored in a user-specific storage location of the cloud storage 132 and the plurality of second portions may be stored in a common storage location of the cloud storage 132.

The plurality of first portions may comprise a plurality of user-specific portions (e.g., unique portions) of the content item and the plurality of second portions may comprise a plurality of common portions (e.g., residual portions) of the content item. The plurality of first portions may be associated with one or more of a user profile/account (e.g., a user profile associated with user profile data 124) or a user device (e.g., device 102). The plurality of second portions may be associated with each recording of the plurality of recordings. As an example, the plurality of recordings may be associated with the plurality of users. The user-specific portions, or first portions, may comprise small portions (e.g., 2-second chunks/segments) of a bitstream associated with the content item. The common portions, or second portions, may comprise the remaining concatenated portions of the bitstream. As a result, the common portions require the associated user-specific portions to be decoded by a user device (e.g., device 102) for playback to a user. In addition, the common portions, or second portions, may be accessible by the plurality of users (e.g., by a plurality of user profiles/ accounts). The content item (e.g., recorded content) may be stored as a single common portion and corresponding user-specific portions. For example, a user-specific recording (e.g., unique recording) may be associated with a recording requested by a user device (e.g., device 102). The representation associated with the unique portion of the requested recording may comprise a small portion (e.g., 1%) of the total recorded content segment and may be associated with a user profile/account or a user device (e.g., device 102). The common portion may comprise the remaining portion (e.g., 99%) and may be associated with, or common to, a plurality of user profiles or user devices. For example, the requested recording may have also been recorded by other user devices associated with other users, wherein the common portion may be associated with the other user devices. In an example, the enhancement layers of the content items may be stored as common/residual portions, especially since the enhancement layers are undecodable without the associated reconstituted base layer. Thus, at the time of recording, the enhancement layers may be referenced from the associated base layers associated with the user-specific portions instead of having enhancement layer-only user-specific portions.

The computing device 104 may determine a playback probability associated with each recording of the plurality of recordings based on a duration of time since each recording was initially stored. For example, as the duration of time since a recording was initially stored increases, the playback probability may decrease. For example, the recording may be initially stored (e.g., recorded) based on user input (e.g., a user request) to record a content item. The duration of time may be based on the duration of time since the recording was initially stored based on the user input. In an example, the playback probability may be based on a duration of time since the recording was requested for playback if the request for playback is subsequent to a previous request for playback. For example, the recording may have been previously played back based on a previous request. The duration of time may be based on the most recent request for playback of the recording. In an example, the playback probability may be based on a duration of time since the content associated with the recording aired (e.g., wherein content is recorded from a live content stream). The computing device 104 may then remove at least one first portion of the plurality of first portions of the content item from storage based on the playback probability associated with at least one recording of the plurality of recordings satisfying a playback probability threshold (e.g., low playback probability). In an example, it may be determined that at least one second portion of the plurality of second portions is no longer associated with any first portion of the plurality of first portions based on the removal of the at least one first portion from storage. The at least one second portion of the plurality of second portions may be removed from storage based on the at least one second portion of the plurality of second portions no longer being associated with any first portion of the plurality of first portions. In an example, the manifest file may be updated (e.g., modified) based on the removal of the at least one first portion. In an example, the compaction process of removing the highest rate full-resolution representations may be performed on the common portions of the stored content item. For example, the compaction process may be performed after the user-specific portions are removed based on low playback probability.

The computing device 104 may be configured to determine (e.g., identify) a first portion and a second portion of a plurality of portions of a content item. The plurality of portions may be associated with a plurality of recordings of the content item in the cloud storage 132. The computing device 104 may determine a duration of time each recording is stored in the cloud storage 132. As an example, the duration of time may be associated with the storage of the first portion or the second portion. The first portion may be associated with a first quality level (e.g., first bitrate, first resolution, etc.) and the second portion may be associated with a second quality level (e.g., second bitrate, second resolution, etc.), wherein the first quality level may be greater than the second quality level. For example, the plurality of portions may be associated with one or more of a plurality of bitrates, a plurality of resolutions, a plurality of enhancement layers, and a plurality of manifest files.

The computing device 104 may cause the first portion to be replaced in the cloud storage 132 with the second portion based on the duration of time satisfying a threshold (e.g., a specified amount of time the portion is in storage). It may be determined that after a threshold duration of time, the probability of playback may decrease. Thus, to reduce the amount of storage space taken up by the recordings of the content item, the first portion (e.g., higher resolution or bitrate) may be replaced with the second portion (e.g., lower resolution or bitrate). Since the first portion may be associated with a higher resolution or bitrate than the second portion, the first portion may occupy a greater amount of space in the cloud storage 132 than the second portion. Replacing the first portion with the second portion, would reduce the amount of space in the cloud storage 132 taken up by the recordings of the content items. In an example, the computing device 104 may change a time-to-live element associated with the first portion. For example, the first portion may be removed (e.g., deleted) from the cloud storage 132 after a duration associated with the time-to-live (e.g., 2 seconds, 30 minutes, etc.). To reduce the amount of storage space taken up by the recordings of the content item, the first portion may be deleted after a duration associated with the time-to-live. In an example, the computing device 104 may simply remove (e.g., delete) the first portion from the cloud storage 132 based on the difference in quality of the first portion and the second portion. In an example, a manifest file associated with the content item may be updated based on the replacement of the first portion in the cloud storage 132 with the second portion or based on the removal of the first portion from the cloud storage 132.

Based on the duration of time satisfying the threshold, the computing device 104 may compare quality of the first portion with the quality of the second portion. For example, the computing device 104 may evaluate a difference in quality between a high-resolution portion and a low-resolution portion upsampled to the high-resolution portion. Based on the difference in quality of the first portion and the second portion (e.g., a substantially imperceptible difference), the computing device 104 may delete the first portion in the cloud storage 132 or replace the first portion in the cloud storage 132 with the second portion. For example, if quality information (e.g., metadata associated with each portion) associated with the content item is unavailable, the computing device may analyze the difference in quality between the first portion and the second portion in order to delete the first portion in the cloud storage 132 or replace the first portion in the cloud storage 132 with the second portion instead of relying on the quality information. For example, the computing device 104 may drop (e.g., remove, delete, etc.), or replace, the high-resolution portion if the difference is deemed insufficiently perceptually important. In an example, the computing device 104 may determine peak-signal-to-noise ratios associated with the first portion and the second portion. The computing device 104 may replace the first portion with the second portion based on the difference in the peak-signal-to-noise ratios associated with the first portion and the second portion. In an example, if a user device (e.g., device 102) requests a content item with a missing high-resolution segment, the computing device 104 may continue trying progressively lower resolutions until the lowest resolution is reached, especially since the ABR ladder exists at all times. For example, if a user device (e.g., device 102) requests a 1080p60 representation, the response to the request may comprise either the content of the requested 1080p60 representation pre-compaction if the 1080p60 representation is present or the content of the 360p30 representation after the compaction if the 1080p60 is not present.

The computing device 104 may determine a first reference frame and a second reference frame of a plurality of reference frames of a content item. The plurality of reference frames may be associated with a plurality of portions of the content item. The content item may be encoded according to one or more of H.264/MPEG-AVC, H.265/MPEG-HEVC, MPEG-5 EVC, H.266/MPEG-VVC, AV1, VP9, Global motion compensation (GMC), and the like. Based on an encoding parameter (e.g., a VVC codec, or an AV1 codec) associated with the content item, the computing device 104 may cause the first reference frame to be replaced (e.g., in the cloud storage 132) with the second reference frame. Similarly as discussed above, it may be determined that after a threshold duration of time, the probability of playback may decrease. Thus, to reduce the amount of storage space taken up by the recordings of the content item, the first reference frame (e.g., higher resolution or bitrate) may be replaced with the second reference frame (e.g., lower resolution or bitrate). Since the first reference frame may be associated with a higher resolution or bitrate than the second reference frame, content encoded with the first reference frame may occupy a greater amount of space in the cloud storage 132 than content encoded with the first reference frame replaced by the second reference frame. Thus, replacing the first reference frame with the second reference frame would reduce the amount of space in the cloud storage 132 taken up by the recordings of the content items. As an example, the first reference frame may be associated with a first quality level (e.g., first bitrate, first resolution, etc.) and the second reference frame may be associated with a second quality level (e.g., second bitrate, second resolution, etc.), wherein the first quality level may be greater than the second quality level. In an example, the user device (e.g., device 102) may receive a requested content item with one or more high-resolution/bitrate reference frames replaced with one or more lower-resolution/bitrate reference frames. As an example, the user device may be configured to playback the lower-resolution/bitrate reference frames of the content item according to the high-resolution/bitrate quality level associated with the high-resolution/bitrate reference frames based on one or more enhancement layers.

The network device 116 may be in communication with a network, such as the network 105. For example, the network device 116 may facilitate the connection of a device (e.g., device 102) to the network 105. As an example, the network device 116 may be configured as a set-top box, a gateway device, or wireless access point (WAP). In an example, the network device 116 may be configured to allow one or more wireless devices to connect to a wired and/or wireless network using Wi-Fi, Bluetooth®, Zigbee®, or any desired method or standard.

The network device 116 may be configured as a local area network (LAN). As an example, the network device 116 may comprise a dual band wireless access point. As an example, the network device 116 may be configured with a first service set identifier (SSID) (e.g., associated with a user network or a private network) to function as a local network for a particular user or users. As an example, the network device 116 may be configured with a second service set identifier (SSID) (e.g., associated with a public/community network or a hidden network) to function as a secondary network or redundant network for connected communication devices.

The network device 116 may comprise an identifier 118. As an example, the identifier 118 may be or relate to an Internet Protocol (IP) Address (e.g., IPV4/IPV6) or a media access control address (MAC address) or the like. As an example, the identifier 118 may be a unique identifier for facilitating communications on the physical network segment. In an example, the network device 116 may comprise a distinct identifier 118. As an example, the identifier 118 may be associated with a physical location of the network device 116.

Figure 2:
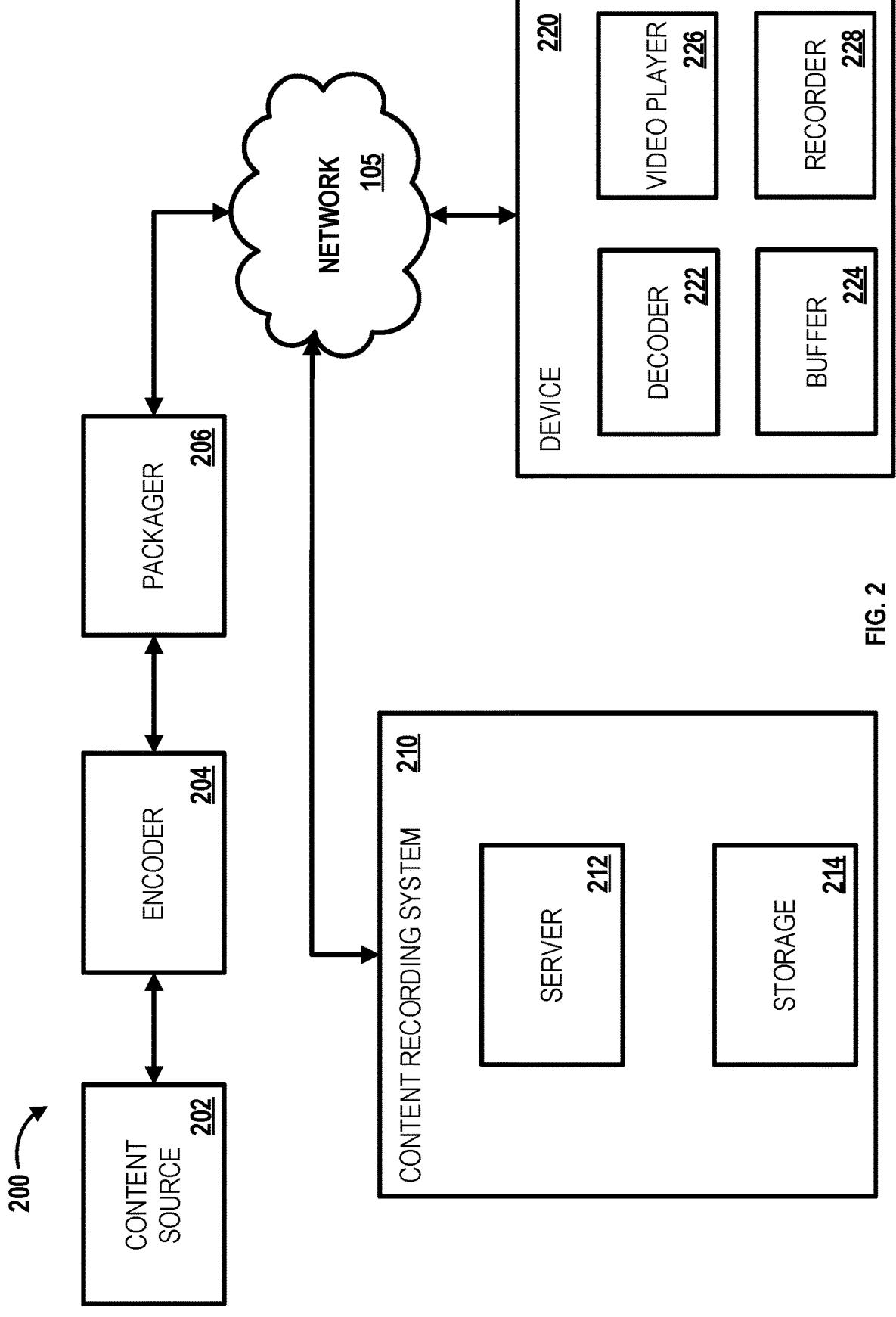
FIG. 2 shows an example system.

FIG. 2 shows an example system 200 for encoding and compressing recorded content items. The example system 200 may comprise a content source 202, an encoder 204, a packager 206, a content recording system 210, and a device 220 in communication via network 105. The content source 202 may output content from a provider (e.g., headend, broadcast source, service provider, cable modem termination system, VOD service/server, etc.). The content may comprise video content such as a program, a television show, a movie, a sports event broadcast, and the like. The content may comprise uncompressed video data in a format such as Moving Picture Experts Group (MPEG) Single Program Transport Stream (MPEG-SPTS). The content source 202 may send uncompressed video data to the encoder 204.

The encoder 204 may be configured to encode the uncompressed video data received from the content source 202. For example, the encoder 204 may encode the uncompressed video data into a compressed format. For example, the encoder 204 may convert the video data from a first video format (e.g., H.264, MPEG-4 Part 2, MPEG-2) to a second video format (e.g., H.264/MPEG-AVC, H.265/MPEG-HEVC, MPEG-5 EVC, H.266/MPEG-VVC, AV1, VP9, Global motion compensation (GMC), etc.).

The encoder 204 may generate multi-rate content comprising compressed video data. For example, a multi-rate content item may comprise one or more data layers. The multi-rate content item may be associated with a layered codec such as LV-EVC to store the highest bitrate representation and/or use mixed-resolution non-layered streams. The one or more data layers may comprise a base layer upon which one or more enhancement layers may be stacked to further enhance the quality of the data of the content item. For example, the multi-rate content item may comprise one or more video representations (e.g., one or more layers) per its regular adaptive bitrate streaming (ABR) ladder (e.g., 1080p60 or 1080 resolution at 60 fps, 720p60, 540p60, 360p60, etc.). The enhancement layers may be used to generate high-resolution video out of lower-resolution base layers. For example, the enhancement layer may be used to generate 1080p60 content based on 540p60 content and 720p60 content based on 360p60 content. Since the probability of content playback may decrease as the recording age of the content item increases, the compaction process may be implemented such that the highest rate full-resolution representations (e.g., 720p60 layer and 1080p60 layer) may be removed from the multi-rate content item, leaving only the enhancement layers. In an example, the removed enhancement layers may be generated just in time at replacement time instead of encoding time. In an example, the encoder 204 may segment the content into a plurality of segments. The encoder 204 may send the compressed multi-rate content to the packager 206.

The packager 206 may receive the content from the encoder 204 or the content recording system 210. In an example, the packager 206 may be configured to segment the content into a plurality of segments. For example, the packager 206 may segment each multi-rate content item into a plurality of segments. In an example, the packager 206 may additionally insert one or more cues or markers into the content segments, wherein one or more additional segments, such as segments comprising an advertisement, may be inserted by an upstream client, server, or logical module, such as the device 220 or a server 212.

The packager 206 may generate a manifest file associated with the content. For example, the manifest file may comprise a DASH manifest file. The manifest file may comprise information describing one or more aspects of the associated content item that may be used by the device 220 to playback the content and/or for the content recording system 210 to store and retrieve the content. The manifest file may indicate the availability of one or more segments (e.g., portions) comprising the content, a length of each segment, a number of segments, and/or an order of playback associated with the segments. The manifest may further comprise a network location (e.g., a hyper-text transfer protocol (HTTP) uniform resource locator (URL) link or other universal resource identifier (URI)) for each segment from which the segment may be downloaded, accessed, or retrieved. In an example, the network locations may indicate one or more source locations. For example, the network locations may reference a storage location of one or more segments, or portions, of the multi-rate content. In an example, the manifest file may describe one or more versions/representations (e.g., different quality levels, bitrates, resolutions, etc.) associated with the content item. For example, the manifest file may describe multiple bit rate and/or resolution versions/representations of the multi-rate content. The manifest file may be provided by the server 212 to the device 220 in response to a request by the device 220 for stored/recorded content. The device 220 may download/stream the requested content using the network locations specified in the manifest file. In an example, an initial manifest file may be received, or generated, when a content item is initially compressed. The initial manifest may comprise the descriptions associated with the representations of the content item. The packager 206 may update (e.g., modify) the initial manifest to remove the descriptions associated with the representations that were removed during the compaction process. The packager 206 may send requested content (e.g., request by the device 220) to the content recording system 210.

The content recording system 210 may comprise a cloud or DVR system. As an example, the content source 202 may receive a request to record content via the device 220, wherein the content may be subsequently stored at the content recording system 210, such as in a storage device/location/database 214 of the content recording system 210. The content recording system 210 may comprise server 212 and storage 214. The server 212 may be configured to fulfill a request, from the device 220, to record content and deliver the recorded content to the device 220. As an example, the request from the device 220 may include identification information of the user (e.g., user profile, user account, account identifier, username and/or password, etc.), the device 220, identification information of the requested content (e.g., title), and/or a playback time point or temporal location (e.g., the start of a program or the 12:30 mark in a 30:00 program) in the requested content.

The content recording system 210 may store the compressed multi-rate content received from the packager 206, based on the request, in the storage 214. The storage 214 may comprise cloud storage and/or one or more data storage devices such as volatile memory (e.g., one or more of random access memory (RAM)), a hard disk drive, a network-attached storage (NAS), a storage area network (SAN), a serial advanced technology attachment (SATA) drive, a solid state drive (SSD), or a non-volatile memory express (NVMe) drive upon which the content or portions thereof may be stored. As an example, it may be determined that a probability of playback of the content item may decrease the longer the content item is stored in the storage 214. Thus, to reduce the amount of storage space taken up by the recordings of the content item, the server 212 may remove portions, or frames, of the multi-rate content item from the storage 214.

The server 212 may determine a plurality of first portions of a content item and a plurality of second portions of the content item. For example, the server 212 may store each compressed multi-rate content item in the storage 214 as a plurality of first portions and a plurality second portions. The plurality of first portions and the plurality of second portions may be associated with a compressed multi-rate content item in the storage 214. In an example, each recording may be segmented into a plurality of segments of the content item. Each first portion of the plurality of first portions and each second portion of the plurality of second portions may be associated with each segment of the plurality of segments. In an example, the plurality of first portions and the plurality of second portions may be associated with one or more of a plurality of bitrates, a plurality of representations, a plurality of resolutions, a plurality of enhancement layers, and/or a plurality of manifest files. The plurality first portions may be stored in a user-specific storage location of the storage 214 and the plurality of second portions may be stored in a common storage location of the storage 214. For example, the user-specific storage location may be associated with one or more of a user profile/account or a user device (e.g., device 220) and the common storage location may be associated with a plurality of users (e.g., user profiles) or user devices. For example, the plurality of first portions may comprise a plurality of user-specific portions (e.g., unique portions) of the content item and the plurality of second portions may comprise a plurality of common portions (e.g., residual portions) of the content item. The plurality of first portions may be associated with one or more of a user profile/account or a user device (e.g., device 220). The plurality of second portions may be associated with each recording of the plurality of recordings. As an example, the plurality of recordings may be associated with a plurality of users.

The server 212 may determine a playback probability associated with each recording of the plurality of recordings based on a duration of time since each recoding was initially stored. For example, as the duration of time since a recording was initially stored increases, the playback probability may decrease. In an example, a duration of time of less than a day may indicate a high probability of playback while a duration of time greater than a month may indicate a low probability of playback. In an example, a duration of time of a year or more may indicate a low probability of playback while a duration of time of a month or less may indicate a high probability of playback. The server 212 may then remove at least one first portion of the plurality of first portions of the content item from the storage 214 based on the playback probability associated with at least one recording of the plurality of recordings satisfying a playback probability threshold. In an example, it may be determined that at least one second portion of the plurality of second portions is no longer associated with any first portion of the plurality of first portions based on the removal of the at least one first portion from the storage 214. The at least one second portion of the plurality of second portions may be removed from the storage 214 based on the at least one second portion of the plurality of second portions no longer being associated with any first portion of the plurality of first portions. In an example, the manifest file may be updated (e.g., modified) based on the removal of the at least one first portion. In an example, the compaction process of removing the highest rate full-resolution representations may be performed on the common portions of the stored content item. For example, the compaction process may be performed after the user-specific portions are removed based on low playback probability.

The server 212 may be configured to determine (e.g., identify) a first portion and a second portion of a plurality of portions of a content item. The plurality of portions may be associated with a plurality of recordings of the content item in the storage 214. The server 212 may determine a duration of time each recording is stored in the storage 214. As an example, the duration of time may be associated with storage of the first portion or the second portion. The first portion may be associated with a first quality level (e.g., first bitrate, first resolution, etc.) and the second portion may be associated with a second quality level (e.g., second bitrate, second resolution, etc.), wherein the first quality level may be greater than the second quality level. For example, the plurality of portions may be associated with one or more of a plurality of bitrates, a plurality of resolutions, a plurality of enhancement layers, and a plurality of manifest files.

The server 212 may cause the first portion to be replaced in the storage 214 with the second portion based on the duration of time satisfying a threshold (e.g., a specified amount of time the portion is in storage). It may be determined that after a threshold duration of time, the probability of playback may decrease. Thus, to reduce the amount of storage space taken up by the recordings of the content item, the first portion (e.g., higher resolution or bitrate) may be replaced by the second portion (e.g., lower resolution or bitrate). Since the first portion may be associated with a higher resolution or bitrate than the second portion, the first portion may occupy a greater amount of space in the storage 214 than the second portion. Replacing the first portion with the second portion would reduce the amount of space in the storage 214 taken up by the recordings of the content items. In an example, the server 212 may change a time-to-live element associated with the first portion. For example, the first portion may be removed (e.g., deleted) from the storage 214 after a duration of time associated with the time-to-live (e.g., 2 seconds, 30 minutes, etc.). To reduce the amount of storage space taken up by the recordings of the content item, the first portion may be deleted after a duration of time associated with the time-to-live. For example, the server 212 may simply remove (e.g., delete) the first portion from the storage 214 based on the duration of time satisfying the threshold. In an example, a manifest file associated with the content item may be updated based on the replacement of the first portion in the storage 214 with the second portion or based on the removal of the first portion from the storage 214.

Based on the duration of time satisfying the threshold, the server 212 may compare quality of the first portion with the quality of the second portion. For example, the server 212 may evaluate a difference in quality between a high-resolution portion and a low-resolution portion upsampled to the high-resolution portion. Based on the difference in quality of the first portion and the second portion (e.g., a substantially imperceptible difference), the server 212 may replace the first portion in the storage 214 with the second portion. For example, the server 212 may drop (e.g., remove, delete, etc.), or replace, the high-resolution portion if the difference is deemed insufficiently perceptually important. In an example, the server 212 may determine peak-signal-to-noise ratios associated with the first portion and the second portion. The server 212 may replace the first portion with the second portion based on the difference in the peak-signal-to-noise ratios associated with the first portion and the second portion. In an example, if the device 220 requests a content item with a missing high-resolution segment, the server 212 may continue trying progressively lower resolutions until the lowest resolution is reached, especially since the ABR ladder exists at all times. For example, if the device 220 requests a 1080p60 representation, the response to the request may comprise the content of the requested 1080p60 representation pre-compaction or the content of the 360p30 representation after the compaction.

The server 212 may determine a first reference frame and a second reference frame of a plurality of reference frames of a content item. The plurality of reference frames may be associated with a plurality of portions of the content item. Based on an encoding parameter (e.g., a VVC codec, or an AV1 codec) associated with the compressed multi-rate content item, the server 212 may cause the first reference frame to be replaced in the storage 214 with the second reference frame. It may be determined that after a threshold duration of time, the probability of playback may decrease. Thus, to reduce the amount of storage space taken up by the recordings of the content item, the first reference frame (e.g., higher resolution or bitrate) may be replaced with the second reference frame (e.g., lower resolution or bitrate). Since the first reference frame may be associated with a higher resolution or bitrate than the second reference frame, content encoded with the first reference frame may occupy a larger space in the storage 214 than content encoded with the first reference frame replaced by the second reference frame. Replacing the first reference frame with the second reference frame would reduce the amount of space in the storage 214 taken up by the recordings of the content items. As an example, the first reference frame may be associated with a first quality level (e.g., first bitrate, first resolution, etc.) and the second reference frame may be associated with a second quality level (e.g., second bitrate, second resolution, etc.), wherein the first quality level may be greater than the second quality level. In an example, the device 220 may receive a requested content item with one or more high-resolution/bitrate reference frames replaced with one or more lower-resolution/bitrate reference frames. The device 220 may be configured to playback the lower-resolution/bitrate reference frames of the content item according to the high-resolution/bitrate quality level associated with the high-resolution/bitrate reference frames.

The device 220 (e.g., device 102) may comprise an electronic device such as a smart television, a computer, a smartphone, a laptop, a tablet, a set top box, a display device, a monitor, a wearable computing device, a mobile computing device, a cable modem, a gateway, any computing device configured to receive and/or render content, the like, and/or any combination thereof. The device 220 may comprise a decoder 222, a buffer 224, a video player 226, and a digital video recorder (DVR) 228. In an example, the device 220 (e.g., the video player 116) may be in communication with a display device or may include, or may be integrated with, a display for outputting content to a user. The decoder 222 may be configured to decompress/decode encoded video data received from the encoder 204, the packager 206, and/or the content recording system 210. For example, encoded video data may be received from the encoder 204 and/or the packager 206. The encoded video data may comprise the compressed multi-rate content item. The decoder 222 may be configured to process and decode the compressed multi-rate content item. The video player 226 may be configured to output the processed/decoded video data. In an example, the processed/decoded video data may be buffered (e.g., via buffer 224) as the video data is processed/decoded. In an example, the device 220 may be configured to store live video data in long-term storage (e.g., via DVR 228) to be output to the user at a later point in time.

Figure 3:
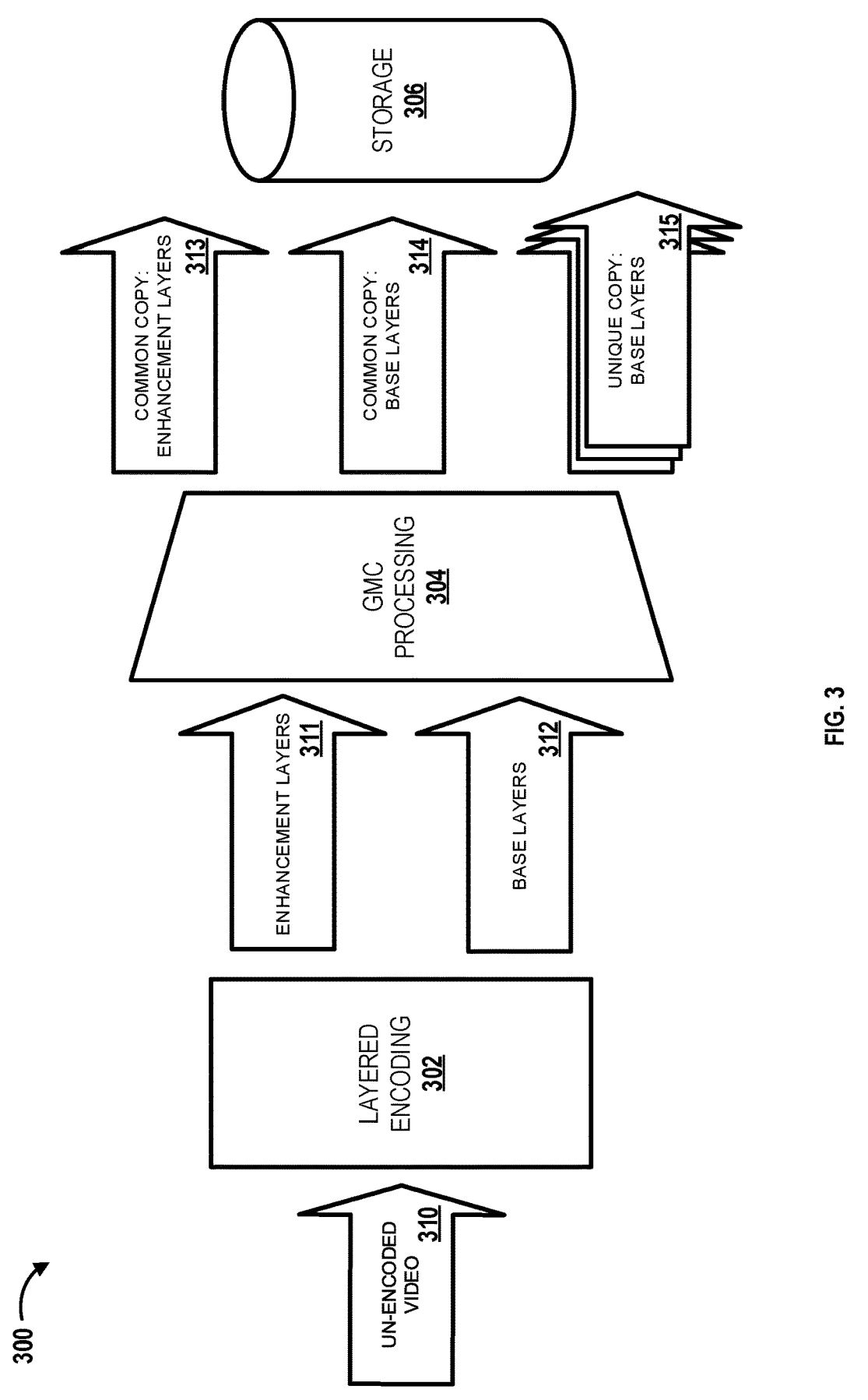
FIG. 3 shows an example storage process.

FIG. 3 shows an example storage process 300. Uncompressed/un-encoded video data 310 may be processed at 302 to generate multi-rate video data. For example, at 302 an encoding device (e.g., the computing device 104, encoder 204, etc.) may receive the uncompressed/un-encoded video data 310 and generate multi-rate video data comprising one or more data layers. The encoding device may generate the multi-rate video data based on adaptive/multiple bitrate streaming. For example, the one or more data layers may be encoded using an additive method such as scalable video coding (SVC). The one or more data layers may comprise a base layer 312 upon which one or more enhancement layers 311 may be stacked to further enhance the quality of the data of the content item. For example, the multi-rate content item may comprise one or more video representations (e.g., one or more layers) per its regular adaptive bitrate streaming (ABR) ladder (e.g., 1080p60 or 1080 resolution at 60 fps, 720p60, 540p60, 360p60, etc.). The enhancement layers 311 may be used to generate high-resolution video out of lower-resolution base layers 312. For example, the enhancement layer 311 may be used to generate 1080p60 content based on 540p60 content and 720p60 content based on 360p60 content. Since the probability of content playback may decrease as the recording age of the content item increases, the encoding device may be configured to implement a compaction process wherein the highest rate full-resolution representations (e.g., 720p60 layer and 1080p60 layer) may be removed from the multi-rate content item, leaving only the enhancement layers.

At 304, Global motion compensation (GMC) processing may be implemented to produce one or more common portions 313/314 (e.g., enhancement layers 311 stored as common portions and common portions of the base layers 312) and one or more unique portions (e.g., user-specific portions of the base layers) 315 of the content item. In an example, the enhancement layers 311 of the content items may be stored as common/residual portions, especially since the enhancement layers 311 are undecodable without the associated reconstituted base layer 312. Thus, at the time of recording the enhancement layers 311 may be referenced from the associated base layers 312 associated with the user-specific portions instead of having enhancement layer-only user-specific portions. The one or more common portions 313/314 and the one or more unique portions 315 of the content item may be stored in storage 306.

The common portions 313/314 may be stored in a common storage location of the storage 306 and the unique portions 315 may be stored in a user-specific storage location of the storage 306. The unique portions 315 may be associated with one or more of a user profile/account or a user device. The common portions 313/314 may be associated with each recording of a plurality of recordings of a content item. The plurality of recordings may be associated with a plurality of users (e.g., user profiles) or user devices. A playback probability associated with each recording of the plurality of recordings may be determined based on a duration of time since each recoding was initially stored. For example, as the duration of time since a recording was initially stored increases, the playback probability may decrease. At least one unique portion 315 of the content item may be removed (e.g., deleted) from the storage 306 based on the playback probability associated with at least one recording of the plurality of recordings satisfying a playback probability threshold. In an example, it may be determined that at least one common portion 313/314 is no longer associated with any unique portions 315 based on the removal of the at least one common portion 313/314 from the storage 306. The at least one common portion 313/314 may be removed (e.g., deleted) from the storage 306 based on the at least one common portion 313/314 no longer being associated with any unique portion 315. In an example, a manifest file may be updated (e.g., modified) based on the removal of the at least one unique portion 315. In an example, the compaction process of removing the highest rate full-resolution representations may be performed on the common portions 313/314 of the stored content item. For example, the compaction process may be performed after the user-specific portions 315 are removed based on low playback probability.

Figure 4:
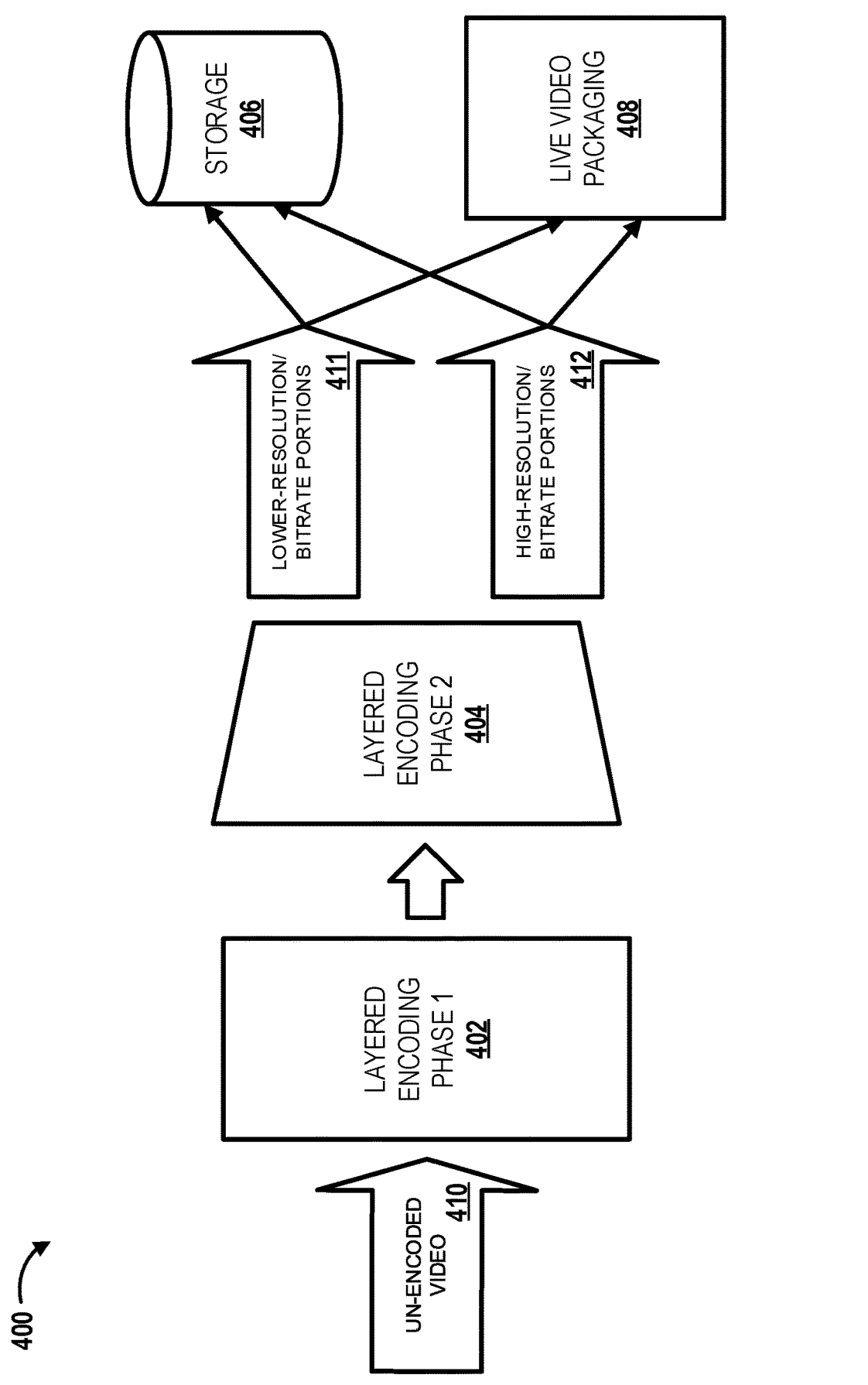
FIG. 4 shows an example storage process.

FIG. 4 shows an example storage process 400. Uncompressed/un-encoded video data 410 may be processed at 402 to generate multi-rate video data. For example, at 402 an encoding device (e.g., the computing device 104, encoder 204, etc.) may receive the uncompressed/un-encoded video data 410 and generate the multi-rate video data comprising one or more data layers. The encoding device may generate the multi-rate video data based on adaptive/multiple bitrate streaming. For example, the one or more data layers may be encoded using an additive method such as scalable video coding (SVC). The one or more data layers may comprise a base layer upon which one or more enhancement layers can be stacked to further enhance the quality of the data of the content item. For example, the multi-rate content item may comprise one or more video representations (e.g., one or more layers) per its regular adaptive bitrate streaming (ABR) ladder (e.g., 1080p60 or 1080 resolution at 60 fps, 720p60, 540p60, 360p60, etc.). The enhancement layers may be used to generate high-resolution video out of lower-resolution base layers. For example, the enhancement layer may be used to generate 1080p60 content based on 540p60 content and 720p60 content based on 360p60 content). Since the probability of content playback may decrease as the recording age of the content item increases, the encoding device may be configured to implement a compaction process wherein the highest rate full-resolution representations (e.g., 720p60 layer and 1080p60 layer) may be removed from the multi-rate content item, leaving only the enhancement layers.

At 404, the multi-rate video data may be processed to determine, or generate, high-resolution/bitrate portions 412 and lower-resolution/bitrate portions 411 of the multi-rate video data. For example, the lower-resolution/bitrate portions 411 may be upsampled to a high-resolution/bitrate portion. As an example, a compaction process may be implemented wherein a high-resolution/bitrate portion 412 may be replaced with a lower-resolution/bitrate portion 411 after a threshold duration of time. For example, the threshold duration of time may be associated with an amount of time the portions 411/412 are stored in storage. It may be determined that after a threshold duration of time, the probability of playback may decrease. Thus, to reduce the amount of storage space taken up by the recordings of the content item, the high-resolution/bitrate portion may be replaced by the lower-resolution/bitrate portion. A difference in quality between a high-resolution portion 412 and a low-resolution portion 411 upsampled to the high-resolution portion may be evaluated. Based on the difference in quality between the high-resolution portion 412 and the upsampled low-resolution portion 411 (e.g., a substantially imperceptible difference), the high-resolution portion 412 may be replaced with the upsampled low-resolution portion 411. For example, the high-resolution portion 412 may be replaced with the upsampled low-resolution portion 411 if the difference is deemed insufficiently perceptually important. In an example, the computing device 104 may determine peak-signal-to-noise ratios associated with the upsampled low-resolution portion 411 and the high-resolution portion 412. The high-resolution portion 412 may be replaced with the upsampled low-resolution portion 411 based on the difference between the peak-signal-to-noise ratios associated with the high-resolution portion 412 and the upsampled low-resolution portion 411. In an example, if a user device requests a content item with a missing high-resolution portion from a cloud storage device (e.g., storage 406), the cloud storage device may continue trying progressively lower resolutions until the lowest resolution is reached, especially since the ABR ladder exists at all times. For example, if a user requests a 1080p60 representation, the response for the request may comprise the content of the requested 1080p60 representation pre-compaction or the content of the 360p30 representation after the compaction. The low-resolution portions 411 and the high-resolution portions 412 may be sent to storage 406 and/or formatted for live video streaming 408 to a user device.

A time-to-live element associated with the high-resolution portion 412 may be updated based on the difference in quality of the high-resolution portion 412 and the upsampled low-resolution portion 411. For example, the high-resolution portion 412 may be removed (e.g., deleted) from the storage 406 after a duration of time associated with the time-to-live (e.g., 2 seconds, 30 minutes, etc.). In an example, a manifest file associated with the content item may be updated based on the replacement of the high-resolution portion 412 in the storage 406 with the upsampled low-resolution portion 411 or based on the removal of the first portion from the storage 406.

Figure 5:
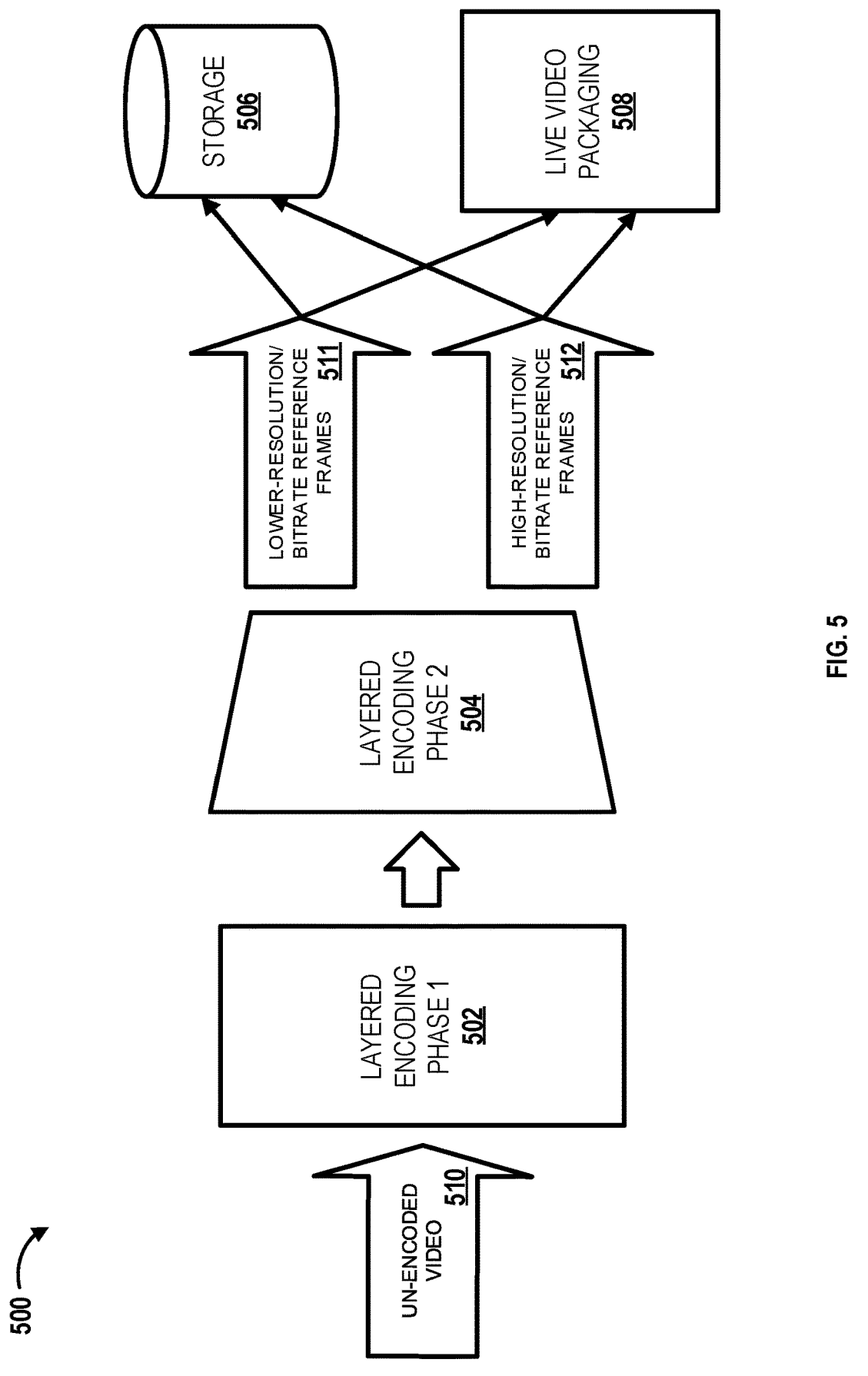
FIG. 5 shows an example storage process.

FIG. 5 shows an example storage process 500. Uncompressed/un-encoded video data 510 may be processed at 502 to generate multi-rate video data. For example, at 502 an encoding device (e.g., the computing device 104, encoder 204, etc.) may receive the uncompressed/un-encoded video data 410 and generate the multi-rate video data comprising one or more data layers. The encoding device may generate the multi-rate video data based on adaptive/multiple bitrate streaming. For example, the one or more data layers may be encoded using an additive method such as scalable video coding (SVC). The one or more data layers may comprise a base layer upon which one or more enhancement layers can be stacked to further enhance the quality of the data of the content item. For example, the multi-rate content item may comprise one or more video representations (e.g., one or more layers) per its regular adaptive bitrate streaming (ABR) ladder (e.g., 1080p60 or 1080 resolution at 60 fps, 720p60, 540p60, 360p60, etc.). The enhancement layers may be used to generate high-resolution video out of lower-resolution base layers. For example, the enhancement layer may be used to generate 1080p60 content based on 540p60 content and 720p60 content based on 360p60 content). Since the probability of content playback may decrease as the recording age of the content item increases, the encoding device may be configured to implement a compaction process wherein the highest rate full-resolution representations (e.g., 720p60 layer and 1080p60 layer) may be removed from the multi-rate content item, leaving only the enhancement layers.

At 504, the multi-rate video data may be processed to determine high-resolution/bitrate reference frames 512 and lower-resolution/bitrate reference frames 511 of the multi-rate video data. For example, each portion of a plurality of portions of the multi-rate video data may comprise a plurality of frames. A first frame of each portion may comprise a reference frame. The content item may be encoded according to one or more of H.264/MPEG-AVC, H.265/MPEG-HEVC, MPEG-5 EVC, H.266/MPEG-VVC, AV1, VP9, Global motion compensation (GMC), and the like. Based on an encoding parameter (e.g., a VVC codec, or an AV1 codec) associated with the content item, a high-resolution/bitrate reference frame 512 may be replaced with a lower-resolution/bitrate reference frame 511. It may be determined that after a threshold duration of time, the probability of playback may decrease. Thus, to reduce the amount of storage space taken up by the recordings of the content item, the high-resolution/bitrate reference frame 512 may be replaced with the lower-resolution/bitrate reference frame 511. For example, content encoded with the high-resolution/bitrate reference frame 512 may occupy a larger space in storage (e.g., storage 506) than content encoded with the high-resolution/bitrate reference frame 512 replaced with the lower-resolution/bitrate reference frame 511. Replacing the high-resolution/bitrate reference frame 512 with the lower-resolution/bitrate reference frame 511 would reduce the amount of space in the storage 506 taken up by the recordings of the content items. In an example, a user device may receive a requested content item (e.g., portion of the content item) with one or more high-resolution/bitrate reference frames replaced with one or more lower-resolution/bitrate reference frames. The user device may be configured to playback the lower-resolution/bitrate reference frames of the content item according to the high-resolution/bitrate quality level associated with the high-resolution/bitrate reference frames based on one or more enhancement layers.

FIG. 6 shows a flowchart of an example method 600 for determining one or more portions of a content item to be removed from storage. Method 600 may be implemented by a computing device (e.g., computing device 104, content recording system 210, edge cache device, mid-tier cache device, cloud storage device, server, etc.). At step 602, a plurality of unique portions of a content item and a plurality of common portions of the content item may be determined. For example, the plurality of unique portions of the content item and the plurality of common portions of the content item may be determined by the computing device (e.g., computing device 104, content recording system 210, edge cache device, mid-tier cache device, cloud storage device, server, etc.). The plurality of unique portions and the plurality of common portions may be associated with a plurality of recordings of the content item in storage. The plurality of unique portions may comprise at least one unique portion of the content item associated with one or more of a user profile or a user device. The plurality of common portions may be associated with each recording of the plurality of recordings. Each common portion of the plurality of common portions may be decodable with a unique portion of the plurality of unique portions. For example, the user-specific portions may comprise small portions (e.g., 2-second chunks/segments) of a bitstream associated with the content item. The common portions may comprise the remaining concatenated portions of the bitstream. Thus, the common portions are unplayable without the associated user-specific portions. The plurality of unique portions may be associated with one or more of a plurality of bitrates, a plurality of representations, a plurality of resolutions, a plurality of enhancement layers, or a plurality of manifest files. The plurality of unique portions may be stored in a user-specific storage location and the plurality of common portions may be stored in a common storage location. The plurality of recordings of the content item may be stored at one or more of an edge cache, a mid-tier cache, a cloud storage, or a server.

At step 604, a playback probability associated with each recording of the plurality of recordings may be determined. For example, the playback probability associated with each recording of the plurality of recordings may be determined by the computing device (e.g., computing device 104, content recording system 210, edge cache device, mid-tier cache device, cloud storage device, server, etc.). The playback probability associated with each recording may be associated with a duration of time since each recording was initially stored. For example, as the duration of time since a recording was initially stored increases, the playback probability may decrease.

At step 606, at least one unique portion of the plurality of unique portions may be caused to be removed from storage based on the playback probability associated with at least one recording of the plurality of recordings satisfying a playback probability threshold. For example, the at least one unique portion of the plurality of unique portions may be caused to be removed from storage by the computing device (e.g., computing device 104, content recording system 210, edge cache device, mid-tier cache device, cloud storage device, server, etc.) based on the playback probability associated with at least one recording of the plurality of recordings satisfying a playback probability threshold. The at least one unique portion may be associated with one or more of a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files. In an example, a manifest file associated with the content item may be updated based on the removal of the at least one unique portion. For example, an initial manifest file may be received, or generated, when a content item is initially compressed and/or stored in storage. The initial manifest may comprise the descriptions associated with the portions of the content item. The initial manifest may be updated (e.g., modified) to remove the descriptions associated with the portions that were removed during the compaction process while the content item is stored.

It may be determined that at least one common portion of the plurality of common portions is no longer associated with any unique portion of the plurality of unique portions based on the removal of the at least one unique portion from storage. The at least one common portion of the plurality of common portions may be caused to be removed from storage based on the at least one common portion of the plurality of common portions no longer being associated with any unique portion of the plurality of unique portions.

FIG. 7 shows a flowchart of an example method 700 for determining one or more portions of a content item to be removed from storage. Method 700 may be implemented by a computing device (e.g., computing device 104, content recording system 210, edge cache device, mid-tier cache device, cloud storage device, server, etc.). At step 702, a first portion, at a first quality level, and a second portion, at a second quality level, of a plurality of portions of a content item may be determined. For example, the first portion and the second portion of the plurality of portions of the content item may be determined by a computing device (e.g., computing device 104, content recording system 210, edge cache device, mid-tier cache device, cloud storage device, server, etc.). The plurality of portions may be associated with the plurality of recordings of the content item in storage. The first quality level may comprise one or more of a first bitrate or a first resolution and the second quality level may comprise one or more of a second bitrate or a second resolution. In an example, the first quality level may be greater than the second quality level. The plurality of portions may be associated with one or more of a plurality of bitrates, a plurality of resolutions, a plurality of enhancement layers, or a plurality of manifest files and the first quality level may comprise one or more of a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files. The plurality of portions may be stored in one or more of a user-specific storage location and a common storage location. The plurality of recordings of the content item may be stored in one or more of an edge cache, a mid-tier cache, a cloud storage, or a server.

At step 704, it may be determined that the first portion is to be replaced in storage with the second portion based on a duration of time. For example, the computing device (e.g., computing device 104, content recording system 210, edge cache device, mid-tier cache device, cloud storage device, server, etc.) may determine that the first portion is to be replaced in storage with the second portion based on a duration of time. The duration of time may be associated with storage of the first portion or the second portion. For example, the duration of time may be associated with a duration of time each recording is stored. As an example, it may be determined that after a threshold duration of time, the probability of playback may decrease. Thus, to reduce the amount of storage space taken up by the recordings of the content item, the first portion (e.g., higher resolution or bitrate) may be replaced with the second portion (e.g., lower resolution or bitrate). Since the first portion may be associated with a higher resolution or bitrate than the second portion, the first portion may occupy a larger space in storage than the second portion. Replacing the first portion with the second portion would reduce the amount of space in storage taken up by the recordings of the content items. In an example, a time-to-live element associated with the first portion may be changed/updated based on the difference in quality of the first portion and the second portion. In an example, the first portion may be removed (e.g., deleted) from the storage after a duration associated with the time-to-live (e.g., 2 seconds, 30 minutes, etc.)

Based on the duration of time, a quality of the first portion may be compared with a quality of the second portion. For example, a difference in quality between a high-resolution portion and a low-resolution portion upsampled to the high-resolution portion may be evaluated. For example, the difference in quality may be substantially imperceptible. The high-resolution portion may be dropped (e.g., remove, delete, etc.) or replaced if the difference is deemed insufficiently perceptually important. In an example, the difference in quality between the first portion and the second portion may comprise a difference in a peak-signal-to-noise ratio between the first portion and the second portion.

At step 706, the first portion may be caused to be replaced in storage with the second portion. For example, the computing device (e.g., computing device 104, content recording system 210, edge cache device, mid-tier cache device, cloud storage device, server, etc.) may cause the first portion to be replaced in storage with the second portion. In an example, a manifest file associated with the content item may be updated based on the replacement of the first portion in storage with the second portion. For example, an initial manifest file may be received, or generated, when a content item is initially compressed and/or stored in storage. The initial manifest may comprise the descriptions associated with the portions of the content item. The initial manifest may be updated (e.g., modified) to remove the descriptions associated with the portions that were removed during the compaction process while the content item is stored. In an example, if a user device requests a content item with a missing high-resolution segment, the computing device may continue trying progressively lower resolutions until the lowest resolution is reached, especially since the ABR ladder exists at all times. For example, if a user device requests a 1080p60 representation, the response to the request may comprise the content of the requested 1080p60 representation pre-compaction or the content of the 360p30 representation after the compaction.

Figure 8:
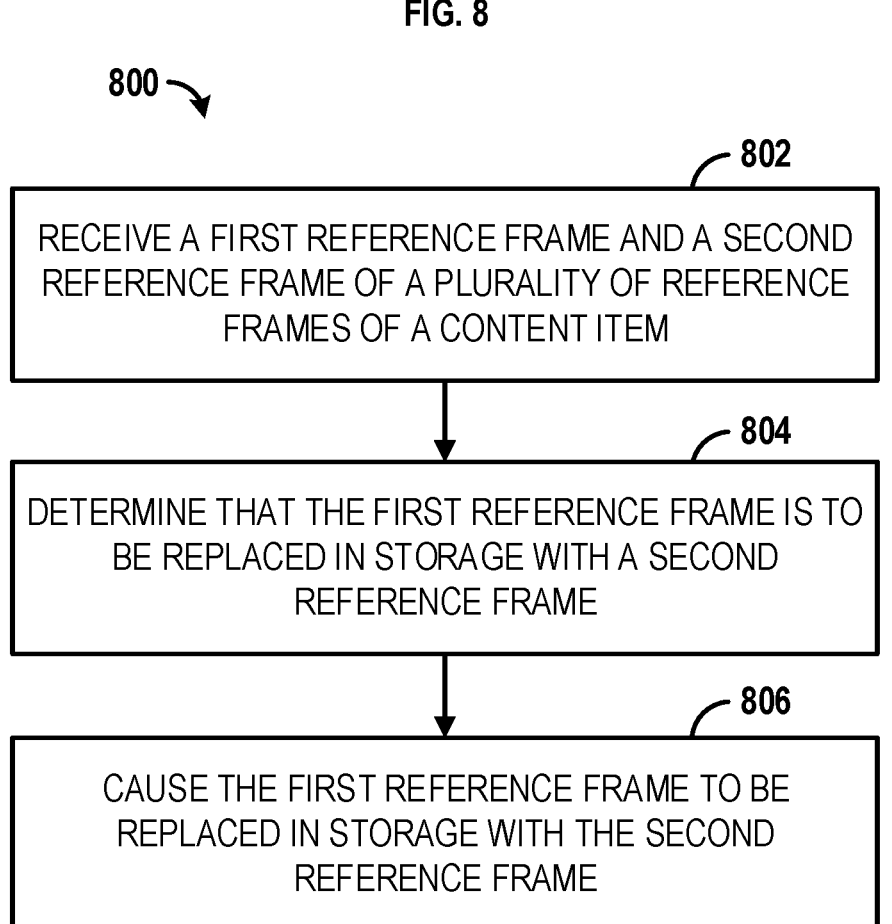
FIG. 8 shows a flowchart of an example method.

FIG. 8 shows a flowchart of an example method 800 for determining one or more reference frames of a content item to be replaced in storage. Method 800 may be implemented by a computing device (e.g., computing device 104, content recording system 210, edge cache device, mid-tier cache device, cloud storage device, server, etc.). At step 802, a first reference frame and a second reference frame of a plurality of reference frames of a content item may be received. For example, the computing device (e.g., computing device 104, content recording system 210, edge cache device, mid-tier cache device, cloud storage device, server, etc.) may receive the first reference frame and the second reference frame of the plurality of reference frames of the content item. The plurality of reference frames may be associated with a plurality of portions of the content item. Each portion of the plurality of portions may comprise an encoded video file of the content item. The plurality of portions may be associated with one or more of a plurality of bitrates, a plurality of resolutions, a plurality of enhancement layers, or a plurality of manifest files. The first reference frame may be associated with a first portion of the plurality of portions associated with one or more of a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files. For example, the first reference frame may be associated with a first quality level and the second reference frame may be associated with a second quality level, wherein the first quality level may be greater than the second quality level. The first quality level may comprise one or more of a first bitrate or a first resolution and the second quality level may comprise one or more of a second bitrate or a second resolution.

At step 804, it may be determined that the first reference frame is to be replaced in storage with a second reference frame based on an encoding parameter associated with the content item. For example, the computing device (e.g., computing device 104, content recording system 210, edge cache device, mid-tier cache device, cloud storage device, server, etc.) may determine that the first reference frame is to be replaced in storage with a second reference frame based on an encoding parameter associated with the content item. For example, it may be determined that after a threshold duration of time, the probability of playback associated with the content item may decrease. Thus, to reduce the amount of storage space taken up by the recordings of the content item, the first reference frame (e.g., higher resolution or bitrate) may be replaced with the second reference frame (e.g., lower resolution or bitrate). Since the first reference frame may be associated with a higher resolution or bitrate than the second reference frame, content encoded with the first reference frame may occupy a larger space in storage than content encoded with the first reference frame replaced by the second reference frame. Replacing the first reference frame with the second reference frame would reduce the amount of space in storage taken up by the recordings of the content items. The encoding parameter may be associated with one or more of a VVC codec or an AV1 codec.

At step 806, the first reference frame may be caused to be replaced in storage with the second reference frame. For example, the computing device (e.g., computing device 104, content recording system 210, edge cache device, mid-tier cache device, cloud storage device, server, etc.) may cause the first reference frame to be replaced in storage with the second reference frame. In an example, a user device may receive a requested content item with one or more high-resolution/bitrate reference frames replaced with one or more lower-resolution/bitrate reference frames. The user device may be configured to playback the lower-resolution/bitrate reference frames of the content item according to the high-resolution/bitrate quality level associated with the high-resolution/bitrate reference frames based on one or more enhancement layers.

Figure 9:
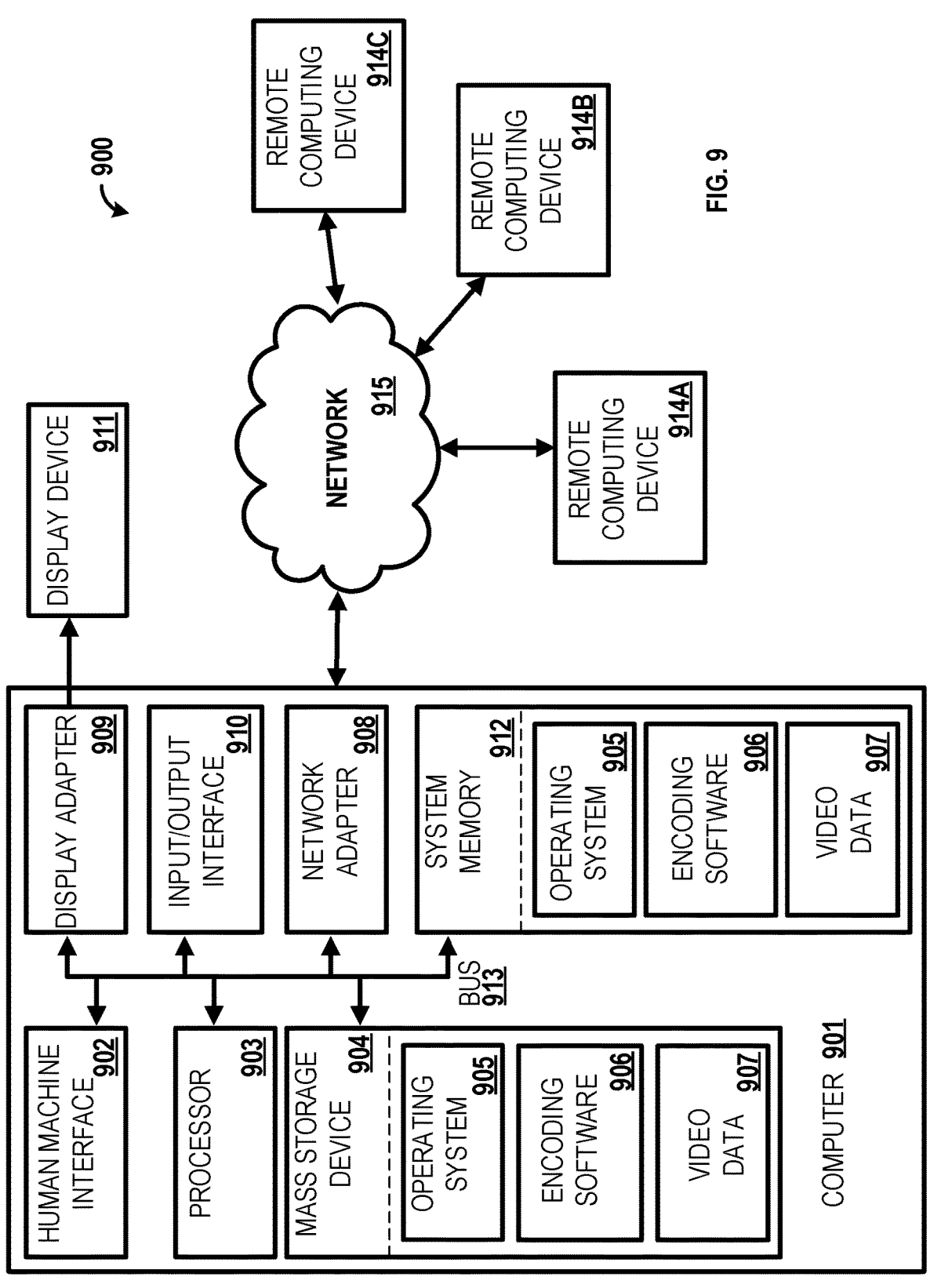
FIG. 9 shows a block diagram of an example system and computing device.

The methods and systems can be implemented on a computer 901 as illustrated in FIG. 9 and described below. By way of example, the computing device 104, the device 102, and/or the network device 116 of FIG. 1 and/or the content source 202, the encoder 204, the packager 206, the content recording system 210, and/or the device 220 of FIG. 2 may be a computer 901 as illustrated in FIG. 9. Similarly, the methods and systems disclosed can utilize one or more computers to perform one or more functions in one or more locations. FIG. 9 is a block diagram illustrating an example operating environment 900 for performing the disclosed methods. This example operating environment 900 is only an example of an operating environment and is not intended to suggest any limitation as to the scope of use or functionality of operating environment architecture. Neither should the operating environment 800 be interpreted as having any dependency or requirement relating to any one or combination of components illustrated in the example operating environment 900.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media such as memory storage devices.

Further, one skilled in the art will appreciate that the systems and methods disclosed herein can be implemented via a general-purpose computing device in the form of a computer 901. The computer 901 can comprise one or more components, such as one or more processors 903, a system memory 912, and a bus 913 that couples various components of the computer 901 comprising the one or more processors 903 to the system memory 912. The system can utilize parallel computing.

The bus 913 can comprise one or more of several possible types of bus structures, such as a memory bus, memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 913, and all buses specified in this description can also be implemented over a wired or wireless network connection and one or more of the components of the computer 901, such as the one or more processors 903, a mass storage device 904, an operating system 905, encoding software 906, video data 907, a network adapter 908, the system memory 912, an Input/Output Interface 910, a display adapter 909, a display device 911, and a human machine interface 902, can be contained within one or more remote computing devices 914A-914C at physically separate locations, connected through buses of this form, in effect implementing a fully distributed system.

The computer 901 typically comprises a variety of computer readable media. Examples of readable media can be any available media that is accessible by the computer 901 and comprises, for example and not meant to be limiting, both volatile and non-volatile media, removable and non-removable media. The system memory 912 can comprise computer readable media in the form of volatile memory, such as random access memory (RAM), and/or non-volatile memory, such as read only memory (ROM). The system memory 912 typically can comprise data such as the video data 907 and/or program modules such as the operating system 905 and the encoding software 906 that are accessible to and/or are operated on by the one or more processors 903.

The computer 901 can also comprise other removable/non-removable, volatile/non-volatile computer storage media. The mass storage device 904 can provide non-volatile storage of computer code, computer readable instructions, data structures, program modules, and other data for the computer 901. For example, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, such as, by way of example, the operating system 905 and the encoding software 906. One or more of the operating system 905 and the encoding software 906 (or some combination thereof) can comprise elements of the programming and the encoding software 906. The video data 907 can also be stored on the mass storage device 904. The video data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 915.

The user can enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 903 via the human machine interface 902 that is coupled to the bus 913, but can be connected by other interface and bus structures, such as a parallel port, game port, an IEEE 1394 Port (also known as a Firewire port), a serial port, a network adapter 908, and/or a universal serial bus (USB).

The display device 911 can also be connected to the bus 913 via an interface, such as the display adapter 909. It is contemplated that the computer 901 can have more than one display adapter 909 and the computer 901 can have more than one display device 911. For example, the display device 911 can be a monitor, an LCD (Liquid Crystal Display), light emitting diode (LED) display, television, smart lens, smart glass, and/or a projector. In addition to the display device 911, other output peripheral devices can comprise components such as speakers (not shown) and a printer (not shown) which can be connected to the computer 901 via an Input/Output Interface 910. Any step and/or result of the methods can be output in any form to an output device. Such output can be any form of visual representation, comprising, but not limited to, textual, graphical, animation, audio, tactile, and the like. The display device 911 and the computer 901 can be part of one device, or separate devices.

The computer 901 can operate in a networked environment using logical connections to one or more remote computing devices 914A-914C. By way of example, a remote computing device 914A-914C can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914A-914C can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components can reside at various times in different storage components of the computing device 901, and are executed by the one or more processors 903 of the computer 901. An implementation of the encoding software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Example computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques comprise, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible nonexpress basis for interpretation, such as: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as examples only, with a true scope and spirit being indicated by the following claims.

The invention claimed is:

1. A method comprising:

determining, by a computing device, a plurality of unique portions and a plurality of common portions associated with a plurality of recordings of a content item in storage, wherein each common portion of the plurality of common portions is associated with one or more unique portions of the plurality of unique portions;

determining a playback probability associated with each recording of the plurality of recordings;

causing, based on the playback probability associated with at least one recording of the plurality of recordings satisfying a playback probability threshold, at least one unique portion of the plurality of unique portions to be removed from storage; and causing, based on at least one common portion of the plurality of common portions no longer being associated with any unique portion of the plurality of unique portions after the removal of the at least one unique portion from storage, the at least one common portion to be removed from storage.

2. The method of claim 1, wherein the at least one unique portion of the content item is associated with one or more of: a user profile or a user device, and wherein the plurality of common portions are associated with each recording of the plurality of recordings.

3. The method of claim 1, wherein each common portion of the plurality of common portions is decodable with at least one unique portion of the plurality of unique portions.

4. The method of claim 1, wherein the plurality of unique portions are associated with one or more of: a plurality of bitrates, a plurality of representations, a plurality of resolutions, a plurality of enhancement layers, or a plurality of manifest files, and wherein the at least one unique portion is associated with one or more of: a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files.

5. The method of claim 1, wherein the plurality of unique portions are stored in a user-specific storage location, and wherein the plurality of common portions are stored in a common storage location.

6. The method of claim 1, wherein the plurality of recordings of the content item are stored at one or more of an edge cache, a mid-tier cache, a cloud storage, or a server.

7. The method of claim 1, wherein the playback probability associated with each recording is associated with a duration of time since each recording was initially stored.

8. The method of claim 1, further comprising:
determining, based on the removal of the at least one unique portion from storage, the at least one common portion of the plurality of common portions is no longer associated with any unique portion of the plurality of unique portions.

9. An apparatus comprising:
one or more processors; and
a memory storing processor-executable instructions that, when executed by the one or more processors, cause the apparatus to:
determine a plurality of unique portions and a plurality of common portions associated with a plurality of recordings of a content item in storage, wherein each common portion of the plurality of common portions is associated with one or more unique portions of the plurality of unique portions;
determine a playback probability associated with each recording of the plurality of recordings;
cause, based on the playback probability associated with at least one recording of the plurality of recordings satisfying a playback probability threshold, at least one unique portion of the plurality of unique portions to be removed from storage; and
cause, based on at least one common portion of the plurality of common portions no longer being associated with any unique portion of the plurality of unique portions after the removal of the at least one unique portion from storage, the at least one common portion to be removed from storage.

10. The apparatus of claim 9, wherein the at least one unique portion of the content item is associated with one or more of: a user profile or a user device, and wherein the plurality of common portions are associated with each recording of the plurality of recordings.

11. The apparatus of claim 9, wherein each common portion of the plurality of common portions is decodable with at least one unique portion of the plurality of unique portions.

12. The apparatus of claim 9, wherein the plurality of unique portions are associated with one or more of: a plurality of bitrates, a plurality of representations, a plurality of resolutions, a plurality of enhancement layers, or a plurality of manifest files, and wherein the at least one unique portion is associated with one or more of: a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files.

13. The apparatus of claim 9, wherein the plurality of unique portions are stored in a user-specific storage location, and wherein the plurality of common portions are stored in a common storage location.

14. One or more non-transitory computer-readable media storing processor-executable instructions that, when executed by at least one processor, cause the at least one processor to:
determine, by a computing device, a plurality of unique portions and a plurality of common portions associated with a plurality of recordings of a content item in storage, wherein each common portion of the plurality of common portions is associated with one or more unique portions of the plurality of unique portions;
determine a playback probability associated with each recording of the plurality of recordings;
cause, based on the playback probability associated with at least one recording of the plurality of recordings satisfying a playback probability threshold, at least one unique portion of the plurality of unique portions to be removed from storage; and
cause, based on at least one common portion of the plurality of common portions no longer being associated with any unique portion of the plurality of unique portions after the removal of the at least one unique portion from storage, the at least one common portion to be removed from storage.

15. The non-transitory computer-readable media of claim 14, wherein the at least one unique portion of the content item is associated with one or more of: a user profile or a user device, and wherein the plurality of common portions are associated with each recording of the plurality of recordings.

16. The non-transitory computer-readable media of claim 14, wherein each common portion of the plurality of common portions is decodable with at least one unique portion of the plurality of unique portions.

17. The non-transitory computer-readable media of claim 14, wherein the plurality of unique portions are associated with one or more of: a plurality of bitrates, a plurality of representations, a plurality of resolutions, a plurality of enhancement layers, or a plurality of manifest files, and wherein the at least one unique portion is associated with one or more of: a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files.

18. The non-transitory computer-readable media of claim 14, wherein the plurality of unique portions are stored in a user-specific storage location, and wherein the plurality of common portions are stored in a common storage location.

19. A system comprising:
a first computing device configured to store a plurality of recordings of a content item in storage; and
a second computing device configured to:
determine a plurality of unique portions and a plurality of common portions associated with the plurality of recordings of the content item in storage, wherein each common portion of the plurality of common portions is associated with one or more unique portions of the plurality of unique portions,
determine a playback probability associated with each recording of the plurality of recordings, cause, based on the playback probability associated with at least one recording of the plurality of recordings satisfying a playback probability threshold, at least one unique portion of the plurality of unique portions to be removed from storage; and cause, based on at least one common portion of the plurality of common portions no longer being associated with any unique portion of the plurality of unique portions after the removal of the at least one unique portion from storage, the at least one common portion to be removed from storage.

20. The system of claim 19, wherein the at least one unique portion of the content item is associated with one or more of: a user profile or a user device, and wherein the plurality of common portions are associated with each recording of the plurality of recordings.

21. The system of claim 19, wherein each common portion of the plurality of common portions is decodable with at least one unique portion of the plurality of unique portions.

22. The system of claim 19, wherein the plurality of unique portions are associated with one or more of: a plurality of bitrates, a plurality of representations, a plurality of resolutions, a plurality of enhancement layers, or a plurality of manifest files, and wherein the at least one unique portion is associated with one or more of: a highest bitrate of the plurality of bitrates, a highest representation of the plurality of representations, a highest resolution of the plurality of resolutions, at least one enhancement layer of the plurality of enhancement layers, or at least one portion of a manifest file of the plurality of manifest files.

* * * * *